(12) United States Patent
Disson et al.

(10) Patent No.: US 10,093,767 B2
(45) Date of Patent: Oct. 9, 2018

(54) MULTILAYER STRUCTURE COMPRISING A LAYER OF SUPRAMOLECULAR MATERIAL AND METHOD FOR THE PRODUCTION THEREOF

(71) Applicant: Arkema France, Colombes (FR)

(72) Inventors: Jean-Pierre Disson, Vernaison (FR); Bruno Van Hemelryck, Chaponost (FR)

(73) Assignee: Arkema France, Colombes (FR)

( * ) Notice: Subject to any disclaimer, the term of this patent is extended or adjusted under 35 U.S.C. 154(b) by 173 days.

(21) Appl. No.: 14/786,849

(22) PCT Filed: Apr. 10, 2014

(86) PCT No.: PCT/FR2014/050858
§ 371 (c)(1),
(2) Date: Oct. 23, 2015

(87) PCT Pub. No.: WO2014/174174
PCT Pub. Date: Oct. 30, 2014

(65) Prior Publication Data
US 2016/0068626 A1    Mar. 10, 2016

(30) Foreign Application Priority Data
Apr. 26, 2013   (FR) .................... 13 53890

(51) Int. Cl.
| | | |
|---|---|---|
| *C08G 83/00* | (2006.01) | |
| *C09D 201/00* | (2006.01) | |
| *C09J 201/00* | (2006.01) | |
| *B29C 39/20* | (2006.01) | |
| *B32B 27/28* | (2006.01) | |
| *C08G 59/14* | (2006.01) | |
| *B32B 27/38* | (2006.01) | |
| *B32B 7/12* | (2006.01) | |
| *C08G 63/12* | (2006.01) | |
| *C08G 63/42* | (2006.01) | |
| *B29K 96/00* | (2006.01) | |
| *B32B 15/08* | (2006.01) | |
| *B29K 63/00* | (2006.01) | |
| *B29L 9/00* | (2006.01) | |

(52) U.S. Cl.
CPC ........ *C08G 59/1477* (2013.01); *B29C 39/203* (2013.01); *B32B 7/12* (2013.01); *B32B 27/38* (2013.01); *C08G 63/12* (2013.01); *C08G 63/42* (2013.01); *C08G 83/002* (2013.01); *C08G 83/008* (2013.01); *C09D 201/005* (2013.01); *C09J 201/005* (2013.01); *B29K 2063/00* (2013.01); *B29K 2096/00* (2013.01); *B29L 2009/005* (2013.01); *B32B 2307/56* (2013.01); *B32B 2307/762* (2013.01); *B32B 2386/00* (2013.01); *B32B 2553/02* (2013.01)

(58) Field of Classification Search
CPC ... F16F 7/00–7/14; B32B 15/04; B32B 15/06; B32B 2307/56; B32B 2307/762
See application file for complete search history.

(56) References Cited

U.S. PATENT DOCUMENTS

| | | | |
|---|---|---|---|
| 8,975,363 B2 | 3/2015 | Hidalgo | |
| 2007/0078227 A1* | 4/2007 | Sugimoto | ............... B32B 3/26 525/242 |
| 2009/0045008 A1* | 2/2009 | Fisk | ............... B32B 15/082 181/286 |
| 2012/0022221 A1* | 1/2012 | Hidalgo | ............... C08G 63/12 525/408 |

FOREIGN PATENT DOCUMENTS

| | | |
|---|---|---|
| EP | 2236541 | 10/2010 |
| WO | 2009071554 | 6/2009 |
| WO | 2010112743 | 10/2010 |

OTHER PUBLICATIONS

Chabert, F. et al., "Supramolecular polymer for enhancement of adhesion and processability of hot melt polyamides," Dec. 2010, pp. 696-705, vol. 30, No. 8, International Journal of Adhesion and Adhesives.
International Search Report for International Application No. PCT/FR2014/050858 dated May 22, 2014.

* cited by examiner

*Primary Examiner* — Ramsey E Zacharia
(74) *Attorney, Agent, or Firm* — RatnerPrestia

(57) ABSTRACT

The invention relates to a multilayer structure comprising at least one layer of supramolecular material and one layer of rigid material, to a method for producing such a structure by casting a composition comprising a precursor of the supramolecular material, and to the uses of the structures produced, especially for applications where a dampening of impacts, vibrations and/or sound waves is desired, for example for producing locomotion vehicles such as automotive, rail, nautical, aeronautical or aerospace vehicles, or for the construction industry.

19 Claims, 2 Drawing Sheets

MULTILAYER STRUCTURE COMPRISING A LAYER OF SUPRAMOLECULAR MATERIAL AND METHOD FOR THE PRODUCTION THEREOF

CROSS-REFERENCE TO RELATED APPLICATIONS

This application is a national phase of International Application No. PCT/EP2014/050858, filed Apr. 10, 2014, which claims priority from French Application No. 1353890, filed Apr. 26, 2013. The entire disclosures of each of these applications are incorporated herein by reference in their entirety for all purposes.

FIELD OF THE INVENTION

The invention relates to a multilayer structure combining at least one layer of supramolecular material with a layer of rigid material, to its process of manufacture and to the uses of such a structure, in particular for applications where damping of impacts, vibrations and/or sound waves is desired, for example for the manufacture of locomotion vehicles, such as automotive, rail, nautical, aeronautical or aerospace vehicles, or also for the construction industry.

TECHNICAL BACKGROUND

Numerous applications resort to multilayer structures combining at least one layer of elastomer material with one or more layers of rigid materials, in order to confer a damping capacity on the structure. Mention may be made, as such, of damping pads for engines or layers of elastomers applied to sheet metals, for example for motor vehicle hoods or casing covers.

Elastomer materials are generally prepared from viscoelastic solid or pasty masses and only acquire their property of damping after crosslinking or vulcanization. It is for this reason difficult to manufacture multilayer structures comprising a layer of elastomer material spread homogeneously and continuously. Apart from the esthetic aspect, the presence of air bubbles in the elastomer layer is liable to weaken the structure. Conventional techniques, such as injection molding, are not very suitable for the manufacture of parts of complex geometry.

Furthermore, the manufacture of damping multilayer structures normally requires a large number of stages: at least one stage of molding a part made of noncrosslinked elastomer of the desired geometry, a stage of crosslinking or vulcanizing this part and a stage of assembling this part with the other part or parts of the structure are generally necessary. The assembling stage, which is generally carried out by adhesive bonding, is a critical operation since it conditions the subsequent strength of the structure: it requires carrying out a first stage of preparation of the surface of the parts to be assembled, for example by degreasing, sandblasting or chemical attack, a second stage consisting of the application of a bonding primer and, finally, a third stage of application of an appropriate adhesive. Furthermore, the presence of intermediate layers, such as the bonding primer and the adhesive, between the elastomer material and the other constituent materials of the structure are liable to considerably reduce the damping efficiency of the system.

Alternatively, the noncrosslinked pasty mass of elastomer can be applied to the surfaces to be treated and then the combination can be cured under a press but this technique does not make it possible to fill in voids which are difficult to access.

There indeed exist certain elastomer materials, such as the polyurethanes, which exhibit the advantage of being able to be employed in a liquid state, and thus of easily filling the molds in order to manufacture parts of complex geometry but these are systems which are highly reactive and require the use of protective equipment during their use as a result of the toxicity of certain reactants.

Another problem lies in the lack of adhesion and of wettability of conventional elastomer materials, which is the cause of premature failure of the structure at the interface between the elastomer material and the other materials which constitute it.

Furthermore, once conventional elastomers are damaged by tears or microcracks, their use in damping may be detrimentally affected to a considerable extent, which requires dismantling and repairing operations.

Finally, the known multilayer structures do not provide, or at least not permanently, a sufficient damping potential.

There thus exists the need to solve, at least partially, the abovementioned problems.

SUMMARY OF THE INVENTION

The present invention achieves this by means of a multilayer structure and of its process of manufacture, as will become clearly apparent on reading the description which will follow.

The first subject matter of the invention is thus a multilayer structure comprising at least two contiguous layers, one comprising at least one supramolecular material and the other comprising at least one rigid material.

A second subject matter of the invention is a process for the manufacture of a multilayer structure in accordance with the invention comprising at least: (i) a stage of pouring a composition comprising at least one supramolecular material precursor, in contact with a layer comprising at least one rigid material, in order to together form two contiguous layers, and (ii) a curing stage, so as to convert the precursor into supramolecular material.

Another subject matter of the invention is the use of the multilayer structure or of an object comprising the multilayer structure to dampen impacts, vibrations and/or sound waves.

The invention is also targeted at the use of the multilayer structure or of an object comprising the multilayer structure to manufacture locomotion vehicles, such as automotive, rail, nautical, aeronautical or aerospace vehicles, or also for the construction industry.

"Contiguous" layers is understood to mean adjacent layers which extend, at least partially, indeed even completely, in contact with one another.

"Rigid" material is understood to mean a material, the flexural modulus of which, at the temperature of use of the multilayer structure of the invention, is greater than 1800 MPa, preferably greater than 2500 MPa and more preferably greater than 3000 MPa.

"Supramolecular material" is understood to mean a material comprising arborescent molecules each consisting of at least difunctional fragments and of at least trifunctional fragments linked to one another by ester or thioester bridges, alone or in combination with amide or urea bridges, said bridges being formed from two functional groups carried by different fragments, said molecules additionally comprising, on the fragments located at the ends of the arborescences, end associative groups capable of associating with one another via hydrogen bonds and covalently connected to the functional groups not participating in said bridges. Embodiments of this supramolecular material have been described by the applicant company, for example in the applications WO 2009/071554 and WO 2010/112743.

In the application WO 2010/112743, the preparation of the supramolecular material comprises a stage of pouring into a nonadherent support of PTFE type, so as to make possible the removal from the mold of the supramolecular material cured in the PTFE mold. The final supramolecular material is not a multilayer structure and does not comprise a layer of rigid material adhering to a supramolecular layer.

"Arborescent" is understood to mean, according to the invention, a branched molecule, the backbone of which comprises at least two branchings. This definition does not exclude various branchings of one and the same molecule from being able to reunite to form loops.

"Associative groups" is understood to mean groups capable of associating with one another via hydrogen bonds, advantageously via 1 to 6 hydrogen bonds. Examples of associative groups which can be used according to the invention are the imidazolidonyl, triazolyl, triazinyl, bis-ureyl or ureido-pyrimidyl groups, preferably being the imidazolidonyl groups. It is preferable for the mean number of the end associative groups per molecule of the material to be at least 3. It is advantageously at most 6. These groups are covalently connected to the molecule. "Covalently" is understood to mean that the associative groups are connected to the end functional groups of the molecule either via a direct bond or, preferably, via a chain, in particular an alkylene chain.

"Functional groups" or "reactive groups" is understood to mean chemical functional groups capable of reacting with other chemical functional groups to form covalent bonds, resulting in particular in the formation of ester, thioester, amide, urea or urethane bridges and in particular of ester and amide bridges. A "difunctional" compound denotes a compound carrying two identical or different reactive functional groups. An "at least trifunctional" compound denotes a compound carrying at least three identical or different reactive functional groups.

"Fragment" is understood to mean, within the meaning of the invention, a unit of a molecule located between two or three bridges as are defined above. A "difunctional" fragment is capable of being obtained from a difunctional compound and a "trifunctional" fragment is capable of being obtained from a trifunctional compound. The aborescent molecules according to the invention comprise at least difunctional, advantageously difunctional, fragments and at least trifunctional, advantageously trifunctional, fragments.

An advantage of the supramolecular material employed in the invention and of its precursor is that the hydrogen bonds are physical bonds which are reversible, in particular under the influence of temperature or by the action of a selective solvent.

Contrary to the conventional compositions for preparing elastomers, the precursor of the supramolecular material of the invention has the advantage of being able to liquefy above a certain temperature, which facilitates its processing, in particular the satisfactory spreading thereof in order to form a homogeneous and continuous layer within the structure of the invention, and also the recycling of the structure. Furthermore, it demonstrates excellent wetting and good adhesion to the layer comprising the rigid material, resulting in the multilayer structure according to the invention.

By virtue of the process of manufacture by pouring of the invention, it is thus possible to manufacture, in a simple way, a multilayer structure combining at least one damping material with at least one rigid material; in particular, it is henceforth possible to dispense with the prior stages of formation and of assembling of a part made of elastomer material and also conventional surface treatments.

The supramolecular material employed in the invention is, like conventional elastomers, capable of exhibiting a dimensional stability over very long times and of recovering its initial shape after large deformations.

The multilayer structures of the invention demonstrate, after curing, an excellent damping capacity for impacts, vibrations and/or sound waves in a wide temperature range, excellent cohesion of the layers which constitute them and good resistance to mechanical stresses, in particular to compression, bending, shearing and tension.

Within the multilayer structure of the invention, the layer comprising the supramolecular polymer additionally demonstrates an ability for self healing in the event of tearing brought about by high mechanical stresses of the structure, in particular in tension, in bending or in shearing. By comparison with the supramolecular material used alone (known from the applications WO 2009/071554 and WO 2010/112743), which requires bringing the fractured surfaces back into contact in order for the healing to take place, within the multilayer structure of the invention, the layer comprising the supramolecular material is capable, once torn, of self-repairing without the need for an external intervention in order to bring the fractured parts back into contact, or to heat or to apply a high pressure or to carry out any chemical reaction. The layer thus repaired advantageously retains its damping role within the structure. The inventors have thus developed a structure in which one or more layers comprising a rigid material extend contiguously to a layer comprising a supramolecular material so as to exert, on it, a stress sufficient to keep its fractured parts in contact and thus to allow it to heal.

DETAILED DESCRIPTION

Figure 1:
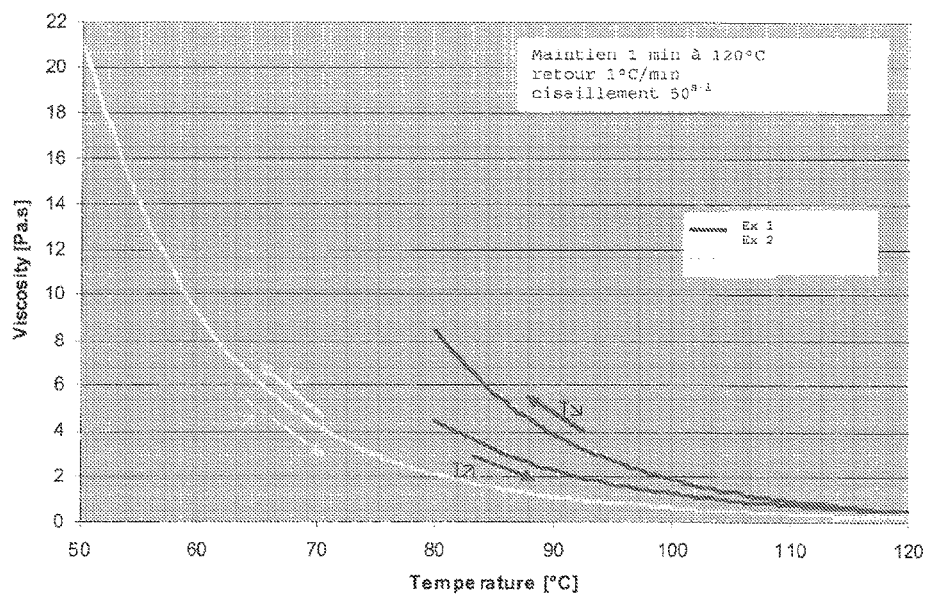
FIG. 1 illustrates the viscosity of precursors of supramolecular materials employed in the invention (in Pa·s) as a function of the temperature (in ° C.), as measured by plate-plate rheometry at a shear rate of 50 s$^{-1}$.

Unless otherwise mentioned, the percentages of material mentioned are percentages by weight.

When reference is made to intervals, the expressions of the type "ranging from . . . to" include the limits of the interval. Conversely, the expressions of the type "of between . . . and . . . " exclude the limits of the interval.

The structure according to the invention comprises at least one layer comprising, indeed even consisting of, at least one rigid material.

Use may in particular be made, as rigid materials, of glass, wood, metals or their alloys, ceramics, polar thermoplastic polymers, with or without fillers, thermosetting resins, concretes, mortars or plasters. These materials can be used alone or as mixtures or assembled in composites, optionally reinforced by fillers or short or long, woven or nonwoven and natural or synthetic fibers.

The wood can be solid wood, laminated wood, plywood or pressed wood.

Mention may be made, as metals and alloys, of steels, brass, bronze, copper, cast iron, aluminum, titanium, tin and their combinations.

Use may in particular be made, as ceramics, of alumina ($Al_2O_3$), silicon nitride ($Si_3N_4$), Sialon, boron carbide ($B_4C$), silicon carbide (SiC), cordierite (magnesium iron aluminosilicate), mullite ($Al_6Si_2O_{13}$), aluminum nitride (AlN), zirconia ($ZrO_2$), optionally stabilized with yttrium ($ZrO_2/Y_2O_3$, referred to as Y-TZP) or with magnesia ($ZrO_2/MgO$, referred to as PSZ), boron nitride (NB), aluminum boride ($AlB_2$), magnesium oxide (MgO), zinc oxide (ZnO), magnetic iron oxide ($Fe_3O_4$), perovskites, such as $BaTiO_3$, $CaTiO_3$, $SrTiO_3$, $(PbSr)TiO_3$ or $Pb(Zr_{0.5}Ti_{0.5})O_3$, steatite ($SiO_4Mg_2$), aluminum silicates (clays), ceramics such as terracotta, faience, stoneware, porcelain, enamels, cements, hydraulic binders, and their combinations.

Mention may be made, as polar thermoplastic polymers, of polycarbonates, polyamides, acrylonitrile/butadiene/styrene (ABS), acrylonitrile/styrene/acrylate (ASA), polyesters, such as poly(ethylene terephthalate) (PET) or polybutylene terephthalate (PBT), polymethyl methacrylate (PMMA), polyetheretherketone (PEEK), polyetherketoneketone (PEKK), poly(ethylene naphthalate) (PEN), polyethersulfones, polyimides, polyacetals, polystyrenes, polyaramids and their combinations.

"Thermosetting resin" is understood to mean a polymer which can be chemically crosslinked by a curing agent to give a thermoset resin which, once obtained, can no longer be converted by the action of heat. Mention may in particular be made, as thermosetting resins which can be employed according to the invention, of epoxy, polyester, vinyl ester, phenol/formaldehyde, polyurethane and urea/formaldehyde resins and their mixtures.

Use may in particular be made, as fibers, of glass fibers, carbon fibers, polyester fibers, polyamide fibers, aramid fibers, cellulose fibers, nanocellulose fibers or also plant fibers (flax, hemp, sisal, bamboo and the like), and their mixtures.

According to one embodiment, said rigid material is a composite material prepared from at least one thermosetting resin and fibers, it being possible for the resin and the fibers to be advantageously chosen from those mentioned above.

According to one embodiment, the rigid material is chosen so that the layer comprising it demonstrates a flexural modulus of greater than 1800 MPa, preferably of greater than 2500 MPa and more preferably of greater than 3000 MPa. The structure of the invention demonstrates, under these conditions, an excellent damping capacity. It is possible in particular to use very rigid materials, such as ceramics, glasses and "hard" metal alloys, such as steels, cast irons or aluminum alloys, and their combinations.

The thickness of the layer comprising the rigid material is not limited to any one value. It can be uniform or variable, depending on the applications targeted.

The structure according to the invention comprises at least one layer comprising, indeed even consisting of, at least one supramolecular material as defined above. This layer can advantageously be obtained by pouring a composition comprising at least one precursor of the said supramolecular material, in contact with a layer comprising a rigid material, and then curing, so as to convert this precursor into supramolecular material, in accordance with the process for the manufacture of the structure according to the invention.

Said precursor can advantageously be prepared according to a process comprising at least the following successive stages:

(a) the reaction of at least one at least trifunctional compound (A) with at least one compound (B) carrying, on the one hand, at least one reactive group capable of reacting with the reactive functional groups of (A) and, on the other hand, at least one associative group, (b) the mixing of the compound(s) obtained in stage (a) with at least one at least difunctional compound (C), the reactive functional groups of which are capable of reacting with the reactive functional groups of the compound (A) during the subsequent curing stage (ii) of the process for the manufacture of the structure of the invention, in order to form ester or thioester bridges, alone or in combination with amide or urea bridges.

The compound (A) employed can in particular carry at least three identical or different functional groups chosen from acid, ester or acyl chloride functional groups, advantageously being acid functional groups. It advantageously comprises from 5 to 100, preferably from 12 to 100 and more preferably from 24 to 90 carbon atoms.

The compound (A) can be employed in the form of a mixture with mono- and difunctional compounds, such as mono- and diacids, in particular fatty acid mono- and dimers.

The compound (A) can in particular be chosen from trimers (oligomers of 3 identical or different monomers) and mixtures of dimers and trimers of fatty acids of vegetable origin.

It is preferable to use trimers (oligomers of 3 identical or different monomers) and mixtures of dimers and trimers of fatty acids of vegetable origin. These compounds result from the oligomerization of unsaturated fatty acids, such as: undecylenic, myristoleic, palmitoleic, oleic, linoleic, linolenic, ricinoleic, eicosenoic or docosenoic acid, which are normally found in pine (tall oil fatty acids), rapeseed, corn, sunflower, soybean, grape seed, linseed or jojoba oils, and also eicosapentaenoic and docosahexaenoic acids, which are found in fish oils.

Mention may be made, as example of ester, of a methyl, ethyl or isopropyl (preferably methyl) ester or a fatty acid trimer or of a mixture of fatty acid oligomers as defined above.

The compound (B) carries at least one reactive group which can in particular be chosen from alcohol or primary or secondary amine groups, advantageously being chosen from primary or secondary amine groups. In an alternative form, the compound (B) can carry at least two such identical or different groups.

The compound (B) can in particular correspond to any one of the formulae (B1) to (B3):

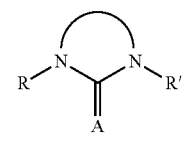

(B1)

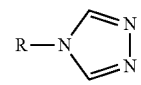

(B2)

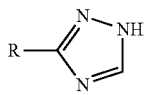

where:
R denotes a unit comprising at least one alcohol or primary or secondary amine group,
R' denotes a hydrogen atom,
A denotes an oxygen or sulfur atom or an NH group, preferably an oxygen atom.

Preferred examples of compounds (B) are 2-aminoethylimidazolidone (UDETA), 1-(2-[(2-aminoethyl)amino]ethyl)imidazolidone (UTETA), 1-(2-[2-{2-aminoethylamino}ethylamino]ethyl)imidazolidone (UTEPA), 3-amino-1,2,4-triazole and 4-amino-1,2,4-triazole. Preferably, the compound (B) is 2-aminoethylimidazolidone (UDETA).

The compound (C) carries at least two identical or different functional groups which can in particular be chosen from epoxy, alcohol and amine functional groups, advantageously being epoxy functional groups.

The compound (C) is preferably a diepoxide or a polyepoxide including at least three epoxide functional groups. In a further alternative form, the compound (C) can be a diol or a polyol including at least three alcohol functional groups.

The compound (C) is preferably a diepoxide. It can thus be chosen from: bisphenol A diglycidyl ether, bisphenol F diglycidyl ether or tetrabromobisphenol A diglycidyl ether, or hydroquinone diglycidyl ether, ethylene glycol diglycidyl ether, propylene glycol diglycidyl ether, butylene glycol diglycidyl ether, neopentyl glycol diglycidyl ether, 1,4-butanediol diglycidyl ether, 1,6-hexanediol diglycidyl ether, cyclohexanedimethanol diglycidyl ether, polyethylene glycol diglycidyl ether, polypropylene glycol diglycidyl ether, polytetramethylene glycol diglycidyl ether, resorcinol diglycidyl ether, neopentyl glycol diglycidyl ether, bisphenol A polyethylene glycol diglycidyl ether, bisphenol A polypropylene glycol diglycidyl ether, terephthalic acid diglycidyl ester, epoxidized polyunsaturated fatty acids and epoxidized limonene; and their mixtures.

In an alternative form, the compound (C) can be a polyepoxide including at least three epoxide functional groups chosen, for example, from: castor oil triglycidyl ether, 1,1,1-tris(hydroxymethyl)propane triglycidyl ether, trisphenol triglycidyl ether, glycerol triglycidyl ether, glycerol propoxylate triglycidyl ether, glycerol ethoxylate triglycidyl ether, trimethylolpropane triglycidyl ether, sorbitol polyglycidyl ether, polyglycerol polyglycidyl ether, pentaerythritol polyglycidyl ether, poly(glycidyl acrylate), polyglycidyl methacrylate, epoxidized polyunsaturated fatty acids, epoxidized vegetable oils, epoxidized fish oils and epoxidized limonene.

In an alternative form, the compound (C) can be a diol. In this case, the compound (C) can be chosen from: ethylene glycol, propylene glycol, tetramethylene glycol, hexamethylene glycol, octanediol, nonanediol, decanediol, diethylene glycol, dipropylene glycol, triethylene glycol, tetraethylene glycol, polyethylene glycol, polypropylene glycol, polytetramethylene glycol, polyesters having hydroxyl ends, polybutadienes having hydroxyl ends, polydimethylsiloxanes having hydroxyl ends, polyisobutylenes having hydroxyl ends, polybutadiene having acrylonitrile copolymers having hydroxyl ends, dimer diols resulting from fatty acids, and their mixtures.

In an alternative form, the compound (C) can be a polyol including at least three alcohol functional groups. Examples of such compounds are in particular: sugars, such as sorbitol, pentaerythritol, trimethylolpropane, and also glycerol and its ethoxylated and propoxylated derivatives, castor oil and dimer diols resulting from fatty acids, such as Pripol® 2033 from Croda.

According to a specific embodiment of the precursor employed in the invention:
the compound (A) is a trimer of at least one of the following acids: undecylenic acid, myristoleic acid, palmitoleic acid, oleic acid, linoleic acid, linolenic acid, ricinoleic acid, eicosenoic acid, docosenoic acid, eicosapentaenoic acid and docosahexaenoic acid,
the compound (B) is chosen from: 2-aminoethylimidazolidone (UDETA), 1-(2-[(2-aminoethyl)amino]ethyl)imidazolidone (UTETA), 1-(2-[2-{2-aminoethylamino}ethylamino]ethyl)imidazolidone (UTEPA), 3-amino-1,2,4-triazole and 4-amino-1,2,4-triazole, and
the compound (C) is chosen from: bisphenol A diglycidyl ether, bisphenol F diglycidyl ether or tetrabromobisphenol A diglycidyl ether, or hydroquinone diglycidyl ether, ethylene glycol diglycidyl ether, propylene glycol diglycidyl ether, butylene glycol diglycidyl ether, neopentyl glycol diglycidyl ether, 1,4-butanediol diglycidyl ether, 1,6-hexanediol diglycidyl ether, cyclohexanedimethanol diglycidyl ether, polyethylene glycol diglycidyl ether, polypropylene glycol diglycidyl ether, polytetramethylene glycol diglycidyl ether, resorcinol diglycidyl ether, neopentyl glycol diglycidyl ether, bisphenol A polyethylene glycol diglycidyl ether, bisphenol A polypropylene glycol diglycidyl ether, terephthalic acid diglycidyl ester, castor oil triglycidyl ether, 1,1,1-tris(hydroxymethyl)propane triglycidyl ether, trisphenol triglycidyl ether, glycerol triglycidyl ether, glycerol propoxylate triglycidyl ether, glycerol ethoxylate triglycidyl ether, trimethylolpropane triglycidyl ether, sorbitol polyglycidyl ether, polyglycerol polyglycidyl ether, pentaerythritol polyglycidyl ether, poly(glycidyl acrylate), polyglycidyl methacrylate, epoxidized polyunsaturated fatty acids, epoxidized vegetable oils, epoxidized fish oils, epoxidized limonene and their mixtures.

The capacity for the absorption of impacts of the structure of the invention can be adjusted by the choice of the compound (C) for a given proportion of the compounds (A), (B) and (C), or by the choice of the compound (A) for a given proportion of the compounds (A), (B) and (C), or also by the choice of the ratio of the compounds (B) and (C).

The capacity for the absorption of impacts of the structure can in particular be reinforced when the compound (C) is chosen from: epoxidized soybean oil, bisphenol A diglycidyl ether or bisphenol F diglycidyl ether.

According to one embodiment, the compound (B) is introduced in stage (a) substoichiometrically with respect to the compound (A), so that some reactive functional groups of the compound (A) remain available on conclusion of the reaction between the compounds (A) and (B). Thus, the molar ratio of the number of reactive groups of the compound (B) capable of reacting with the reactive functional groups of the compound (A) to the number of reactive functional groups of the compound (A) is advantageously between 0.1 and 0.8 and more preferably between 0.2 and 0.6.

According to one embodiment, the molar ratio of the number of reactive functional groups of the compound (C) capable of reacting with the reactive functional groups of the compound (A) to the number of reactive functional groups of the compound (A) is between 0.1 and 0.9 and more preferably between 0.4 and 0.8.

The adjustment of the above ratios makes possible a good compromise in terms of self healing capacity of the supramolecular material and of cohesion of the structure of the invention.

According to one embodiment, the molar ratio of the number of reactive groups of the compound (B) and of reactive functional groups of the compound (C) capable of reacting with the reactive functional groups of the compound (A) to the number of reactive functional groups of the compound (A) is between 0.8 and 1.2 and more preferably between 0.9 and 1.1.

According to one form of preparation of the precursor, stage (b) of mixing the compound (C) with the compound or compounds resulting from stage (a) is carried out at a temperature ranging from 50° C. to 150° C. and preferably from 70° C. to 130° C.

The composition comprising the precursor can optionally additionally comprise at least one compound chosen from fillers, pigments, dyes, polymers, plasticizers, long or short, woven or nonwoven and synthetic or natural fibers, for example chosen from those mentioned above, flame retardants, antioxidants, lubricants or other additives conventional to the formulation of polymers or intended to adjust the properties of the layer incorporating the precursor within the structure of the invention. The composition comprising the precursor can also comprise at least one catalyst intended to accelerate the subsequent crosslinking thereof, during the curing stage (ii).

The composition comprising the precursor is subsequently poured in contact with the layer comprising the rigid material. The pouring is advantageously carried out so that the viscosity of the composition is less than 50 Pa·s, preferably less than 30 Pa·s, preferably less than 10 Pa·s and entirely preferably at a viscosity ranging from 0.1 to 5 Pa·s, as measured by plate-plate rheometry at a shear rate of 50 s$^{-1}$. The temperature of the composition can in particular be adjusted, by any appropriate means, in order to achieve the required fluidity.

According to one embodiment, the composition comprising the precursor is poured into a space at least partially delimited by the layer comprising the rigid material and a seal placed in contact with the layer comprising the rigid material. Preferably, this space is delimited by at least one other layer, placed facing the layer comprising the rigid material and in contact with the seal. In a first alternative form, this other layer is an integral part of the multilayer structure. Alternatively, it is intended to be removed on conclusion of the stage (ii) of curing the structure. Such a layer can, for example, be a nonstick film, in particular a silicone film.

The seal provides the leaktightness of the arrangement during the stage (ii) of curing the structure. It is preferably made of a flexible material which can be of any nature known to a person skilled in the art, provided that it is stable at the curing temperature. This material is preferably selected for its ability to be easily detached, after the curing stage, from the layers in contact with which it is found (in other words, at least the layer comprising the supramolecular material and the layer comprising the rigid material). Use may be made, for example, of a seal made of PVC, Teflon, PVDF, silicone, and the like.

According to one embodiment, the layer or layers comprising the rigid material and the seal are kept in contact during the pouring stage (i) using any clamping means, for example clamps and/or one or more rigid plates positioned on either side of the external faces with the largest dimensions of the multilayer structure.

According to one embodiment, the precursor is poured via at least one, and preferably one, orifice laterally passing through the seal. The composition comprising the precursor can in particular be injected using a gun provided at one of its ends with an injection nozzle and connected by another of its ends to a melting machine. A nozzle, such as those used for hotmelt applications, or a capillary capable of being thrust into the orifice, or an automatic or manual syringe, can be used.

According to one embodiment, the composition comprising the precursor is spread in contact with the rigid layer using any appropriate means, for example a brush, including a fine brush, a roll or a coating device. It is thus possible to produce structures comprising particularly thin layers of supramolecular materials.

The multilayer structure of the invention is subsequently subjected, locally or completely, to a curing stage, so as to convert the said precursor into supramolecular material. A structure demonstrating in particular the desired damping, healing and/or cohesion properties is thus obtained. This stage is preferably carried out at a temperature ranging from 80° C. to 180° C., advantageously from 100° C. to 150° C. and more advantageously from 110° C. to 130° C. According to one embodiment, the assembly formed by the multilayer structure, the seal and optional clamping means are exposed to this temperature. Alternatively, it is possible to locally subject the precursor to the curing stage, without exposing the remainder of the structure. It is possible, for example, to use a blowing heating means, a heat gun or an infrared heating means.

Thus, a multilayer structure is obtained which comprises a layer comprising a supramolecular material comprising connecting bridges, preferably amide bridges, advantageously formed in stage (a) of preparation of the precursor by reaction of the reactive groups (advantageously primary or secondary amine groups) of the compound (B) with reactive functional groups (advantageously acid functional groups) of the compound (A) and connecting bridges (advantageously ester bridges) advantageously formed in the curing stage (ii) by reaction of the remaining reactive functional groups (preferably acid functional groups) of the compound (A) with reactive functional groups (advantageously epoxy groups) of the compound (C). This material also includes hydrogen bonds between the associative groups carried by the molecules which constitute it.

The multilayer structure of the invention exhibits a high absorption capacity for impacts over a wide temperature range. This absorption capacity for impacts depends in particular on the loss factor (or tangent delta) of the layer comprising the supramolecular material. It is preferable for the layer comprising the supramolecular material to exhibit a tangent delta of greater than 0.5, over a broad temperature range of at least 30° C., as measured by dynamic mechanical thermoanalysis (DMTA), for different stresses (rectangular torsion, tension, compression). The tangent delta of the layer comprising the supramolecular material can in particular and advantageously be adjusted by the choice and the proportions of the compounds (A), (B) and (C), or also by the addition of additives to the composition intended to form the layer comprising supramolecular material, such as fillers or plasticizers.

The layer comprising the supramolecular material can, if appropriate, comprise other materials, in particular resulting from formulation additives present in the composition from which this layer results, as explained above. In an alternative form, the supramolecular material can be present in the layer in the dispersed state or in a bi-continuous phase with at least one other material, for example polymer.

According to one embodiment, the multilayer structure of the invention comprises at least two adjacent or nonadjacent layers comprising a supramolecular material. This can make it possible to confer, on the multilayer structure, the property of damping in a broader range of temperatures or frequencies of stresses, in comparison with a structure comprising solely one or other of these layers. For example, the supramolecular material of at least one of the layers comprising a supramolecular material is chosen so that the layer incorporating it exhibits a tangent delta of greater than 0.5 in a range of temperatures or of frequencies of stresses which is different from the tangent delta of at least one of the other layers comprising a supramolecular material.

Furthermore, it is understood that the supramolecular material present in the multilayer structure of the invention can include molecules other than the arborescent molecules described above, in particular in the case where the compound (A) includes fatty acid trimers mixed with fatty acid mono- and/or dimers. Advantageously, the material employed in the invention includes at least 25% and better still at least 50% by number of said arborescent molecules.

It is preferable according to the invention for this material to also include intermolecular hydrophobic bonds advantageously due to interactions between alkyl groups carried by each of the arborescent molecules described above. "Alkyl" is understood to mean, within the meaning of the invention, side groups ($C_nH_{2n+1}$) and not alkylene ($C_nH_{2n}$) chains, for example. Particularly preferably, each of these molecules comprises $C_6$-$C_{24}$ alkyl chains, advantageously in greater number than said end associative groups. They can in particular be contributed by the compounds (A), in particular when fatty acid trimers are concerned.

The supramolecular material employed in the invention advantageously exhibits elastomer properties, that is to say the property of being able to be subject to a uniaxial strain at ambient temperature and of recovering, once this stress is released, its initial dimension, with a set of less than 10% and preferably of less than 5% of its initial dimension, according to the strain initially applied.

According to one embodiment, the shear modulus G' of the layer comprising the supramolecular material ranges from 1 to 500 MPa and preferably from 3 to 100 MPa. A satisfactory flexibility of the multilayer structure is thus obtained.

According to one embodiment, the layer comprising the supramolecular material exhibits at least one portion, the thickness of which ranges from 5 μm to 20 mm, preferably from 5 μm to 10 mm. "Portion" is regarded as being any section of the structure delimited by two planes perpendicular to its faces of greatest dimensions. The layer comprising the rigid material can, of course, exhibit a uniform thickness within the abovementioned ranges. The layer comprising the supramolecular material can in particular exhibit a thicker portion at the point where the maximum damping is desired. This alternative embodiment is all the easier to carry out with the manufacturing process of the invention, which makes it possible to pour supramolecular material into voids of complex geometry. A good compromise in terms of quality of the layer (continuity, evenness of its thickness) and of overall stiffness of the structure is obtained with these ranges of thicknesses.

When it is applied with a low thickness, advantageously from 5 to 200 microns, in particular from 15 to 50 microns, the layer comprising the supramolecular material can, in addition to or alternatively to its damping role, be used as adhesive.

According to one embodiment, the multilayer structure according to the invention comprises at least one third layer contiguous with the layer comprising the supramolecular material, so that the layer comprising the supramolecular material is sandwiched, at least partially, if not completely, between the layer comprising the rigid material ("first layer") and this third layer.

The third layer can comprise, indeed even consist of, any material, depending on the applications targeted. It can advantageously be a rigid material, identical to or different from that present in the first layer, advantageously chosen from those listed above. In an alternative form, it can be a flexible material, advantageously chosen from elastomers, conferring additional mechanical properties on the structure with respect to those contributed by the supramolecular layer, such as better resistance to abrasion or greater chemical resistance. Mention may be made, as such, of polyurethane-based elastomers, NBRs (nitrile/butadiene rubbers), natural rubber, SBRs (styrene/butadiene rubbers), thermoplastic elastomers, styrene elastomers and their combinations.

According to a specific embodiment, the layer comprising the supramolecular material extends between a layer of conducting material, for example a metal, and a layer of insulating material, for example a glass, a ceramic, concrete or a composite material combining different insulating materials.

The multilayer structure can, of course, comprise, in addition to the layers described above, one or more additional layers of any nature known to a person skilled in the art, insofar as their presence does not detrimentally affect the advantageous properties of the structure which are obtained in accordance with the invention.

The layer comprising the rigid material can in particular carry, on any portion of face which is not in contact with the layer comprising the supramolecular material, an optional coating or may have been subjected to an optional surface treatment.

It is the same for the layer comprising the supramolecular material, as concerns any portion of its faces which is not in contact with the layer or layers comprising the rigid material, as are defined above.

The multilayer structure according to the invention can itself be incorporated in an object or a structure of greater size. In this regard, at least two multilayer structures in accordance with the invention can be superimposed or juxtaposed. It is advantageously possible to use the supramolecular material defined above as seal between these structures.

EXAMPLES

The following examples illustrate the invention without limiting it.

Example 1: Process for the Synthesis of a Precursor of Supramolecular Material According to the Invention 1000 g of Pripol® 1040 from Croda (acid number 186), i.e. 3.32 mol of carboxylic acid, and 245 g of 2-aminoethylimidazolidone (UDETA) with a purity of 87.6% by weight, i.e. 1.66 mol of amine, are introduced into a Schott reactor with a working volume of 4000 ml placed on an electrical heating mantle and equipped with a temperature probe, a mechanical stirrer with a rotor of anchor type made of polytetrafluoroethylene, a dropping funnel, a reflux condenser, a Dean and Stark apparatus and a nitrogen inlet terminated by a dip pipe made of polytetrafluoroethylene. It is assumed that the impurities of the UDETA can contribute the equivalent of an additional 0.13 mol. The mixture is heated at 170° C. in order to remove the water of condensation. When the water of condensation is removed and trapped in the Dean and Stark apparatus, the medium is cooled to 80° C. At 80° C., 294 g of an epoxy resin of BADGE type, Epikote® 828 EL from Resolution® (epoxy content of 5.2 mol/kg), i.e. 1.53 mol, are added and stirring is allowed to take place at 80° C. for 15 minutes. The product thus obtained is emptied from the reactor. Its viscosity is measured by plate-plate rheometry at a shear rate of 50 s$^{-1}$. FIG. 1 shows that, in a temperature range extending at least from 80° C. to 120° C., the product obtained is liquid. It is subsequently stored without curing in polypropylene containers.

Example 2: Process for the Synthesis of a Precursor of Supramolecular Material According to the Invention 1000 g of Pripol® 1040 from Croda (acid number 186), i.e. 3.32 mol of carboxylic acid, and 245 g of 2-aminoethylimidazolidone (UDETA) with a purity of 87.6% by weight, i.e. 1.66 mol of amine, are introduced into a Schott reactor with a working volume of 4000 ml placed on an electrical heating mantle and equipped with a temperature probe, a mechanical stirrer with a rotor of anchor type made of polytetrafluoroethylene, a dropping funnel, a reflux condenser, a Dean and Stark apparatus and a nitrogen inlet terminated by a dip pipe made of polytetrafluoroethylene. It is assumed that the impurities of the UDETA can contribute the equivalent of an additional 0.13 mol. The mixture is heated at 170° C. in order to remove the water of condensation. When the water of condensation is removed and trapped in the Dean and Stark apparatus, the medium is cooled to 120° C. At 120° C., 414 g of epoxidized soybean oil, Ecepox® PB 3 from Arkema (epoxy content of 3.7 mol/kg), i.e. 1.53 mol, are added and stirring is allowed to take place at 120° C. for 15 minutes. The product thus obtained is emptied from the reactor. Its viscosity is measured by plate-plate rheometry at a shear rate of 50 s$^{-1}$. FIG. 1 shows that, in a temperature range ranging at least from 50° C. to 120° C., the product obtained is liquid. It is subsequently stored without curing in polypropylene containers.

Example 3: Preparation of an Aluminum/Supramolecular Material Bilayer Structure Obtained from the Precursor of Example 1

The following assembly is produced: a rigid steel plate of 20 cm by 20 cm and with a thickness of 2 mm is available, to which a nonstick silicone film of the same dimensions is applied. A countermold is produced with a steel plate comparable to the preceding one to which an aluminum strip of the same dimensions and with a thickness of 0.5 mm is applied. A PVC seal with a diameter of 2.5 mm is subsequently positioned, in the form of a U, with a spacing between the branches of 18 cm, between the aluminum strip and the silicone film, in order to guarantee the leaktightness of the assembly. The assembly thus produced (steel plate/ silicone film/PVC seal/aluminum strip/steel plate) is held in clamped position by clamps. The precursor obtained in example 1 is placed in a melting machine at 80° C. and then poured into the opening of the U formed by the PVC seal, between the aluminum strip and the silicone film. After filling, the assembly is placed in a ventilated oven at 120° C. for 24 h. On conclusion of this treatment, the clamps are unfastened and the steel plates, the silicone film and the PVC seal are removed. The cured supramolecular material easily detaches from the silicone film and from the PVC seal; on the other hand, it adheres strongly to the aluminum strip. A bilayer structure composed of a layer of 2.5 mm of supramolecular material placed side by side with a layer of aluminum with a thickness of 0.5 mm is thus obtained.

Example 4: Preparation of an Aluminum/Supramolecular Material Bilayer Structure Obtained from the Precursor of Example 2

The procedure is the same as in example 3, the precursor being replaced by that obtained in example 2 and the assembly being placed, after filling, in a ventilated oven at 120° C. for 48 h. A bilayer structure composed of a layer of 2.5 mm of supramolecular material placed side by side with a layer of aluminum with a thickness of 0.5 mm is thus obtained.

Example 5: Preparation of an Aluminum/Supramolecular Material Obtained from the Precursor of Example 1/Aluminum Trilayer Sandwich Structure The procedure is the same as in example 3, the silicone film being replaced with an aluminum strip with the same length and the same width and with a thickness of 0.5 mm. The precursor obtained in example 1 is placed in a melting machine at 80° C. and then poured into the opening of the U formed by the PVC seal, between the two aluminum strips. After filling, the assembly is placed in a ventilated oven at 120° C. for 24 h. On conclusion of this treatment, the clamps are unfastened and the steel plates and the PVC seal are removed. The cured supramolecular material adheres strongly to the two aluminum strips. A trilayer sandwich structure, composed of a layer of 2.5 mm of supramolecular material between two layers of aluminum with a thickness of 0.5 mm, is thus obtained.

Example 6: Preparation of an Aluminum/Supramolecular Material Obtained from the Precursor of Example 2/Aluminum Trilayer Sandwich Structure The procedure is the same as in example 5, the precursor being replaced with that obtained in example 2 and the assembly being placed, after filling, in a ventilated oven at 120° C. for 48 h. A trilayer sandwich structure, composed of a layer of 2.5 mm of supramolecular material between two layers of aluminum with a thickness of 0.5 mm, is thus obtained.

Figure 2:
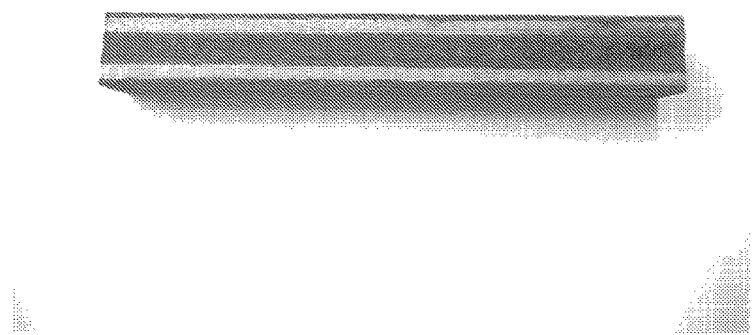
FIGS. 2 and 3 are photographs of trilayer structures in accordance with the invention, the supramolecular material being sandwiched between two rigid layers.

Example 7: Preparation of a Wood/Supramolecular Material/Wood Trilayer Sandwich Structure Two sheets of plywood with a thickness of 5 mm are kept apart by a PVC seal arranged in the form of a U. This assembly is kept clamped by clamps and then preheated in an oven at 80° C. for 20 min. The assembly is removed from the oven, held in the position of the vertical U and the precursor obtained in example 2 is poured into the opening of the U using a melting machine, the vessel of which is heated to 80° C. and the nozzle to 100° C. The assembly is subsequently placed in an oven at 120° C. for 48 hours. On conclusion of this treatment, the clamps are removed. A trilayer sandwich structure, composed of a layer of 4 mm of supramolecular material between two layers of plywood with a thickness of 0.5 mm, is thus obtained. FIG. 2 illustrates a side view of the structure.

Example 8: Preparation of Rigid Material/Supramolecular Material as a Thin Layer/Rigid Material Trilayer Sandwich Structures Test of Shearing Behavior Different trilayer structures, formed by an internal layer made of material shown in the first column of table 1, sandwiched between two external layers made of material shown in the first line of table 1, are prepared.

In order to test these structures in shearing, they are put together so as to form test specimens in accordance with the standard NF-EN ISO 9964. Strips with the dimensions w=20×l=50×t=2 mm are cut out from the various materials listed in the first line of table I. 50 mg of the polymer precursor of examples 1 and 2 or of one of the adhesives shown in the first column of table 1 are applied, at the end of some strips, to a surface delimited by the entire width of the test specimen and a length of 15.6 mm. The surface area thus covered is 312.5 mm², which corresponds to a layer with a thickness of approximately 150 to 160 microns. When the precursor of example 1 or 2 is used, it is preheated beforehand to 80° C., before it is applied by pouring. A second strip of the same material as the first strip is subsequently applied to the layer thus formed, this second strip being oriented at 180° with respect to the first, so as to obtain a test specimen for measurement of shearing behavior according to the abovementioned standard NF-EN ISO 9964.

The test specimens comprising the precursors of examples 1 and 2 are subjected to curing in an oven at 120° C. for 24 h, are removed from the oven and are then conditioned at 21° C. for 24 hours under a relative humidity of 50%.

A tensile test is subsequently carried out with an Instron model 5565 machine and a 5 kN sensor. The pull rate is 10 mm/min. The cohesive forces measured are given in table 1 below for the various test specimens. The values obtained with the structures according to the invention are thus compared with those comprising, as internal layer, a commercial adhesive. The structures of the invention demonstrate a good compromise in terms of cohesion and of flexibility of the internal layer made of supramolecular material.

TABLE I

| | Force at break (N) | | | | |
|---|---|---|---|---|---|
| | Fir wood | Plywood 3 mm | Steel | Stainless steel | PMMA |
| Wood adhesive[1] | 850 | 1100 | | | |
| Flexible adhesive[2] | 130 | 160 | 35 | | 40 |
| Flexible adhesive [3] | 100 | 350 | 15 | | 40 |
| Polymer Ex. 1 | 130 | | | 55 | 80 | 530 |
| Polymer Ex. 2 | | 550 | 170 | 400 | 320 |

[1] PVA adhesive from Sader
[2] liquid neoprene contact adhesive from Sader
[3] silicone adhesive Sporlit ® special rubbers and plastics, Henkel Example 9: Peel Test A peel test is carried out according to the standard ASTDM D429-B on the sandwich structure of example 5. For this, test specimens are produced by cutting the sandwich structure along a plane perpendicular to its faces having the greatest dimensions. Jaws are placed on either side of the external faces of the test specimen, on the faces of the aluminum strips which are not in contact with the supramolecular material. A breaking force of 3.1 N/mm with a 40% cohesive failure facies is obtained. In other words, in 40% of the cases, the failure takes place in the layer of supramolecular material and not at its interfaces with the aluminum layers, which demonstrates satisfactory adhesion.

Example 10: Peel Test on the Sandwich Structure of Example 6

A peel test is carried out according to the standard ASTDM D429-B on the sandwich structure of example 6 by proceeding as in example 9. A breaking force of 3.1 N/mm with a 20% cohesive failure facies is obtained.

Figure 3:
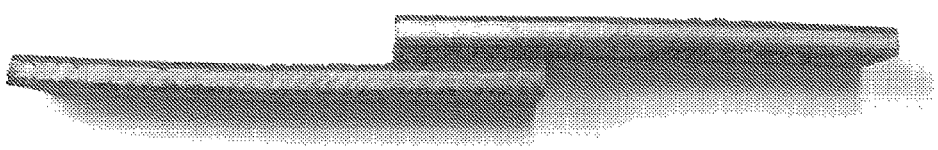
Figure 4:
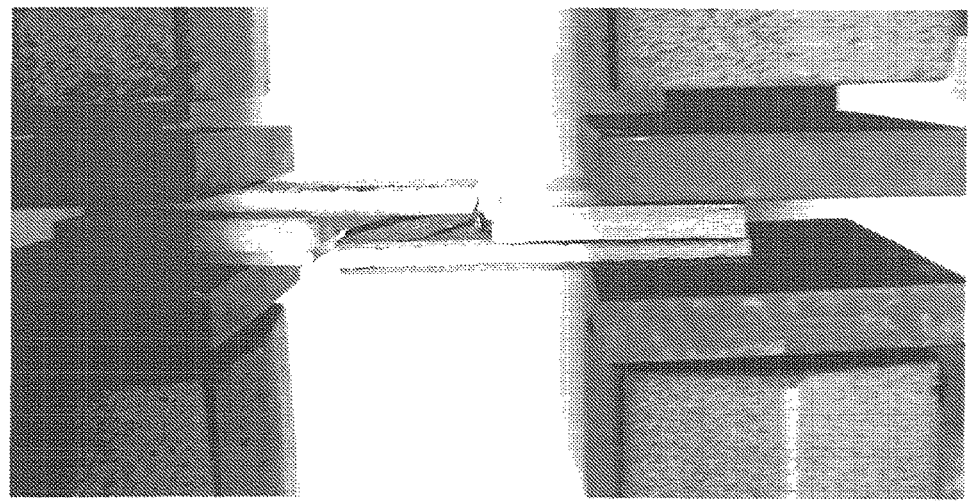
FIG. 4 illustrates the cohesive failure of the layer comprising the supramolecular material within a structure in accordance with the invention.

Example 11: Test of Shearing Behavior and of Healing of a Wood/Supramolecular Material/Wood Sandwich Structure The procedure is the same as in example 7 for pouring the supramolecular material precursor obtained in example 2 between two sheets of plywood. A seal with a diameter of 3 mm is used. After curing the assembly at 120° C. for 48 h, the structure is cut into bands with a width of 14 mm and the plywood pieces are cut up again so as to obtain shearing test specimens as illustrated in FIG. 3. The 8 test specimens obtained exhibit thicknesses of supramolecular material layer ranging from 2.3 to 3 mm. Blocks are adhesively bonded on either side of the layers of wood in order to make possible the aligning of the jaws of the tensile testing device. The test specimens are conditioned at 23° C. and 50% relative humidity for 24 h before being subjected to tensile tests according to the standard DIN EN 1465. For each of the test specimens, cohesive failure is observed, that is to say failure inside the layer of supramolecular material and not at the interface between this material and the sheets of plywood, as illustrated in FIG. 4.

For the 8 test specimens thus tested, elongations at break of the structures of 26% (standard deviation 3.3%) and breaking stresses of 0.4 MPa (standard deviation 0.2 MPa) are obtained.

After failure, the broken faces of the test specimens are put back in place face to face and left thus for a week. At the end of this period, a further tensile test is carried out. Elongations at break of the structures of 23% (standard deviation 1%) and breaking stresses of 0.29 MPa (standard deviation 0.04 MPa) are obtained. Thus, after healing, approximately 88% of the elongation at break and 72% of the breaking stress were restored.

Example 12: Test of Shearing Behavior and of Healing of a Metal/Supramolecular Material/Metal Sandwich Structure The procedure is the same as in example 11 but with the precursor of example 1 or 2 being poured between two identical metal plates chosen from plates of stainless steel with a thickness of 2 mm, plates of aluminum with a thickness of 2 mm and plates of alumina with a thickness of 4 mm, with dimensions w=20 cm×l=20 cm. Seals with diameters of 2, 3 and 4 mm are used. When the precursor of example 1 is used, the assemblages are cured at 120° C. for 24 h and, when the precursor of example 2 is used, the assemblages are cured at 125° C. for 48 h. The results of the tensile tests, before and after healing, are given in table II.

TABLE II

| Rigid material | Supra-molecular material (Ex. 1 or 2) | Thickness of the layer of supra-molecular material (mm) | Breaking strength (MPa) | Elongation at break (%) | Breaking strength, after healing (MPa) | Elongation at break, after healing (%) |
|---|---|---|---|---|---|---|
| Stainless steel | 2 | 2.8 | 0.6 | 25.5 | 0.4 | 20 |
| Aluminum | 2 | 2.8 | 0.55 | 28 | 0.41 | 21 |
| Alumina | 2 | 2.8 | 0.48 | 24.8 | 0.38 | 20.9 |
| Stainless steel | 1 | 2.8 | 2.4 | 20 | 1.8 | 18 |
| Aluminum | 1 | 2.8 | 2.1 | 19 | 1.6 | 15 |
| Alumina | 1 | 2.8 | 2.35 | 18.5 | 2.0 | 14.3 |
| Aluminum | 2 | 4 | 0.51 | 35 | 0.4 | 26 |
| Aluminum | 2 | 1.7 | 0.48 | 16 | 0.33 | 13 |

The invention claimed is:

1. A multilayer structure comprising at least two contiguous layers, referred to as first and second layers, the first layer comprising at least one rigid material and the second layer comprising at least one supramolecular material, said supramolecular material comprising arborescent molecules each comprising at least difunctional fragments and at least trifunctional fragments linked to one another by ester or thioester bridges, alone or in combination with amide or urea bridges, said bridges being formed from two functional groups carried by different fragments, said molecules additionally comprising, on the fragments located at the ends of the arborescences, end associative groups capable of associating with one another via hydrogen bonds and covalently connected to the functional groups not participating in said bridges, wherein the first layer is configured and arranged to exert sufficient stress on the second layer such that the second layer, once torn, self-heals.

2. The multilayer structure as claimed in claim 1, wherein the second layer comprising the supramolecular material exhibits at least one portion, the thickness of which ranges from 5 µm to 20 mm.

3. The multilayer structure as claimed in claim 1, wherein the second layer comprising the supramolecular material exhibits a shear modulus G' ranging from 1 to 500 MPa.

4. The multilayer structure as claimed in claim 1, wherein the second layer comprising the supramolecular material exhibits a tangent delta of greater than 0.5, over a broad temperature range of at least 30° C., as measured by dynamic mechanical thermoanalysis.

5. The multilayer structure as claimed in claim 1, wherein the supramolecular material present in the second layer is such that said associative groups are selected from the group consisting of imidazolidonyl, triazolyl, triazinyl, bis-ureyl and ureido-pyrimidyl groups.

6. The multilayer structure as claimed in claim 1, wherein the multilayer structure comprises at least one third layer contiguous with the second layer comprising the supramolecular material, so that the layer comprising the supramolecular material is sandwiched, at least partially, between said first and third layers.

7. A process for the manufacture of a multilayer structure according to claim 1, comprising at least (i) a stage of pouring a composition comprising at least one supramolecular material precursor, in contact with the layer comprising at least one rigid material, in order to together form the two contiguous layers, and (ii) a curing stage carried out so as to convert said precursor into the supramolecular material comprising arborescent molecules each comprising at least difunctional fragments and at least trifunctional fragments linked to one another by ester or thioester bridges, alone or in combination with amide or urea bridges, said bridges being formed from two functional groups carried by different fragments, said molecules additionally comprising, on the fragments located at the ends of the arborescences, end associative groups capable of associating with one another via hydrogen bonds and covalently connected to the functional groups not participating in said bridges.

8. The process as claimed in claim 7, wherein the supramolecular material precursor is obtained by at least the following successive stages:
(a) the reaction of at least one at least trifunctional compound (A) with at least one compound (B) carrying, on the one hand, at least one reactive group capable of reacting with the reactive functional groups of (A) and, on the other hand, at least one associative group,
(b) the mixing of the compound(s) obtained in stage (a) with at least one at least difunctional compound (C), the reactive functional groups of which are capable of reacting with the reactive functional groups of the compound (A) during the curing stage (ii), in order to form ester or thioester bridges, alone or in combination with amide or urea bridges.

9. The process as claimed in claim 8, wherein the compound (A) carries at least three identical or different functional groups selected from the group consisting of acid, ester and acyl chloride functional groups.

10. The process as claimed in claim 8, wherein the compound (B) carries at least one reactive group selected from the group consisting of alcohol and primary and secondary amine groups.

11. The process as claimed in claim 8, wherein the compound (B) corresponds to any one of the formulae (B1) to (B3):

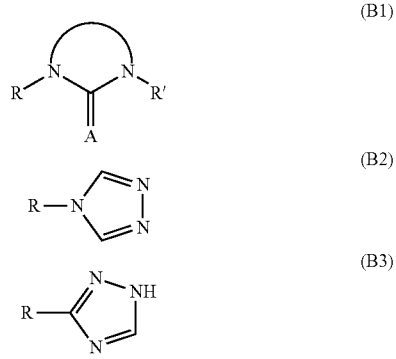

where:
R denotes a unit comprising at least one alcohol or primary or secondary amine group,
R' denotes a hydrogen atom,
A denotes an oxygen or sulfur atom or an NH group.

12. The process as claimed in claim 8, wherein the compound (B) is selected from the group consisting of 2-aminoethylimidazolidone (UTETA), 1-(2-[(2-aminoethyl)amino]ethyl)imidazolidone (UTETA), 1-(2-[2-{2-aminoethylamino}ethylamino]ethyl)imidazolidone (UTEPA), 3-amino-1,2,4-triazole and 4-amino-1,2,4-triazole.

13. The process as claimed in claim 8, wherein the compound (C) carries at least two identical or different functional groups selected from the group consisting of epoxy, alcohol and amine functional groups.

14. The process as claimed in claim 7, wherein the composition comprising the precursor is poured during stage (i) at a viscosity of less than 50 Pa·s, as measured by plate-plate rheometry at a shear rate of 50 s$^{-1}$.

15. The process as claimed in claim 7, wherein the curing stage (ii) is carried out at a temperature ranging from 80° C. to 180° C.

16. An object comprising at least one multilayer structure defined according to claim 1.

17. A method for damping at least one of impacts, vibrations or sound waves, comprising using a multilayer structure defined according to claim 1.

18. A method for manufacturing a locomotion vehicle, comprising using a multilayer structure defined according to claim 1.

19. The multilayer structure as claimed in claim 1, wherein the supramolecular material present in the second layer is such that said associative groups are imidazolidonyl groups.

* * * * *